United States Patent
Schreiber

(10) Patent No.: US 6,532,658 B2
(45) Date of Patent: Mar. 18, 2003

(54) PROCESS FOR THE MANUFACTURE OF A BLADE/VANE OF A TURBOMACHINE

(75) Inventor: Karl Schreiber, Mellensee (DE)

(73) Assignee: Rolls-Royce Deutschland Ltd. & Co KG, Dahlewitz (DE)

( * ) Notice: Subject to any disclaimer, the term of this patent is extended or adjusted under 35 U.S.C. 154(b) by 0 days.

(21) Appl. No.: 09/731,984

(22) Filed: Dec. 8, 2000

(65) Prior Publication Data

US 2001/0029668 A1 Oct. 18, 2001

(30) Foreign Application Priority Data

Dec. 10, 1999 (DE) .......................................... 199 59 598

(51) Int. Cl.[7] ............................................... B23P 15/00
(52) U.S. Cl. ................... 29/889.71; 29/889.7; 29/421.1
(58) Field of Search ........................ 29/889.7, 889.71, 29/889.72, 421.1, 419.1

(56) References Cited

U.S. PATENT DOCUMENTS

| | | | |
|---|---|---|---|
| 3,699,623 A | | 10/1972 | Kreider |
| 4,292,725 A | | 10/1981 | Larsson |
| 4,470,862 A | * | 9/1984 | More et al. .................. 156/217 |
| 5,042,968 A | * | 8/1991 | Fecto ......................... 264/46.6 |
| 5,222,297 A | | 6/1993 | Graff et al. ................. 29/889.7 |
| 5,269,657 A | * | 12/1993 | Garfinkle .................... 244/124 |
| 5,384,959 A | * | 1/1995 | Velicki ...................... 29/889.71 |
| 5,400,505 A | * | 3/1995 | Wei et al. ...................... 29/460 |
| 5,482,584 A | * | 1/1996 | Herrmann et al. .......... 156/172 |
| 5,509,781 A | * | 4/1996 | Boszor et al. ............ 29/889.71 |
| 5,605,441 A | * | 2/1997 | Boszor et al. ............ 29/889.71 |
| 5,755,558 A | * | 5/1998 | Reinfelder et al. ........ 29/889.7 |
| 5,887,332 A | * | 3/1999 | Champenois et al. ....... 264/258 |
| 5,951,254 A | | 9/1999 | Sikorski |
| 6,047,474 A | * | 4/2000 | Millet et al. ................... 29/558 |
| 6,074,706 A | * | 6/2000 | Beverley et al. ........... 29/527.3 |

FOREIGN PATENT DOCUMENTS

| | | |
|---|---|---|
| DE | 2915412 | 1/1990 |
| DE | 4320374 | 12/1994 |
| DE | 19627860 | 1/1998 |
| DE | 19726911 | 1/1999 |

* cited by examiner

Primary Examiner—I Cuda-Rosenbaum
(74) Attorney, Agent, or Firm—The Law Offices of Timothy J. Klima

(57) ABSTRACT

In a process for the manufacture of a blade/vane of a turbomachine, the blade/vane is made of a metallic enveloping structure and a supporting structure made of composite material provided inside of the enveloping structure and suitably joined to the enveloping structure. A metal-felt weave is welded or soldered/brazed to the sheet making up the enveloping structure, whereupon this sheet-weave-assembly is shaped by hydroforming or an internal high-pressure forming process to provide the enveloping structure of the blade/vane. Finally, the composite material making up the supporting structure is introduced into the cavity of the enveloping structure.

6 Claims, 1 Drawing Sheet

PROCESS FOR THE MANUFACTURE OF A BLADE/VANE OF A TURBOMACHINE

This application claims priority to German Patent Application 19959598 filed on Dec, 10, 1999.

BACKGROUND OF THE INVENTION

This invention relates to a process for the manufacture of a blade/vane of a turbomachine, in particular a gas-turbine engine, said blade/vane consisting of a metallic enveloping structure and a supporting structure made of a composite material which is provided inside the enveloping structure and is suitably joined to the enveloping structure. For background art, reference is made to DE 196 27 860 C1 and, in particular, to U.S. Pat. No. 3,699,623.

Composite materials or composites, i.e. in particular fibrous composite materials with polymeric and metallic matrix, find widest use for the manufacture of technical components. The main reason for their use is normally the favorable weight-to strength ratio. However, the surface characteristics of the composite material frequently do not satisfy the given requirements, which necessitates application of a metallic protective coating, for example, to the surface of the component made of such composite material. Since the material and physical properties of this protective coating and of the composite material frequently differ widely, the joint between the two elements of the component, the interface, is a weak point of this compound construction.

The aforementioned Specification U.S. Pat. No. 3,699,623 teaches a manufacturing process according to the generic part of claim 1, in which a metallic enveloping structure made of titanium is applied around a supporting structure made of a metallic-fiber reinforced composite material. A diffusion couple is thus formed between the enveloping structure and the supporting structure. Apparently, this manufacturing process is only suitable for metallic-matrix composite material and, in the long term, provides only an insufficiently stable bond between the enveloping structure and the so-called supporting structure.

The aforementioned Specification DE 196 27 860 C1 teaches a further manufacturing process according to the generic part of claim 1, in which a metal-felt weave made of metallic fibers or filaments is applied on the surface of a supporting structure made of a fiber-reinforced plastic and is bonded to the plastic structure with the same resin binding agent. The mechanical, virtually positive joint thus achievable is intended to increase the mechanical strength of the surface of the blade/vane made under this process; however, this process fails to provide a continuous surface which thus also lacks homogenous properties.

Summarizing, no process is presently known which enables a highly stressable joint to be made between a metallic skin or the enveloping structure, respectively, which provides for both corrosive and mechanical protection, and a supporting structure in a composite material in the inside of the enveloping structure. In a broad aspect, the present invention provides a solution to the above problematic.

BRIEF SUMMARY OF THE INVENTION

It is a particular object the present invention to provide for this solution in that a metal felt weave is welded or soldered/brazed to a metal sheet which forms the enveloping structure, whereupon this sheet-felt-assembly is shaped to the blade/vane enveloping structure by hydro-forming or internal high-pressure forming, and in that the composite material which makes up the supporting structure is subsequently introduced into the cavity of the enveloping structure. Further objects and advantages of this invention become apparent from the subclaims, in particular a preferred blade/vane of a turbomachine manufactured under the process according to this invention.

BRIEF DESCRIPTION OF THE DRAWINGS

For clarity reasons, reference is now made to the principal sketches enclosed, which shall not be construed to be a restriction to the preferred embodiment here shown in simplified form only.

The FIGS. 1–3 illustrate the sequence of process steps according to the present invention.

DETAILED DESCRIPTION OF THE INVENTION

Figure 1:
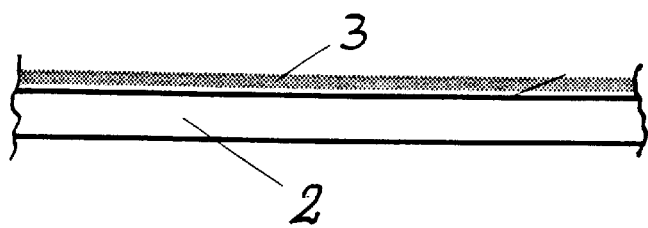

In the first step of the process according to the present invention (cf. FIG. 1), a metal-felt weave 3 is welded or soldered/brazed to a suitably sized metal sheet 2, from which the enveloping structure 1 of a blade/vane of a turbomachine will later be formed (cf. FIG. 3 in advance). This metal-felt weave must not be a precisely knit weave, but may be any type of metallic felt fabric provided it can be soldered/brazed or welded to the metal sheet 2 with adequate strength.

Figure 2:
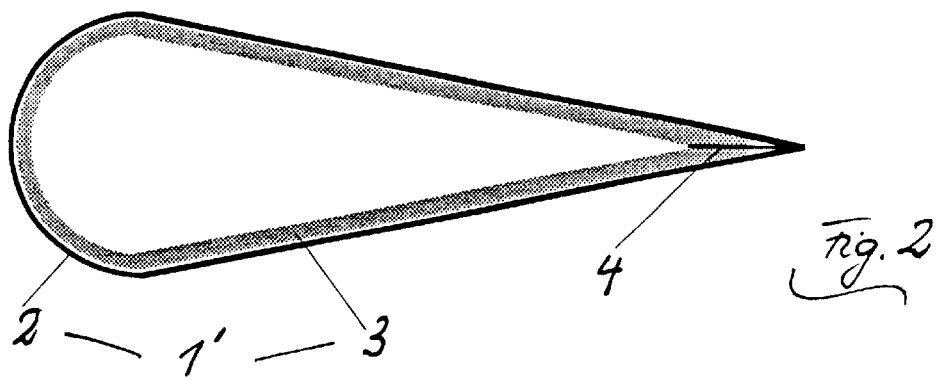

As illustrated in FIG. 2, the sheet-weave-assembly 1' so produced, which comprises the sheet 2 and the metal-felt weave 3 attached to it, is pre-formed to a hollow body resembling the finished enveloping structure 1, this hollow body being shown as section and also being indicated with the reference numeral 1'. In this pre-forming process, the sheet 2 is virtually folded such that rim edges which are in opposite positions on the plane sheet 2 are made to abut each other and are then joined with each other by a roller seam weld 4, for example. Of course, this virtual folding process shall not produce a folding kink line in the radius area of the hollow body 1'. As is apparent, this virtual folding process is made such that the metal-felt weave 3 will be in the interior of the hollow body 1'.

Figure 3:
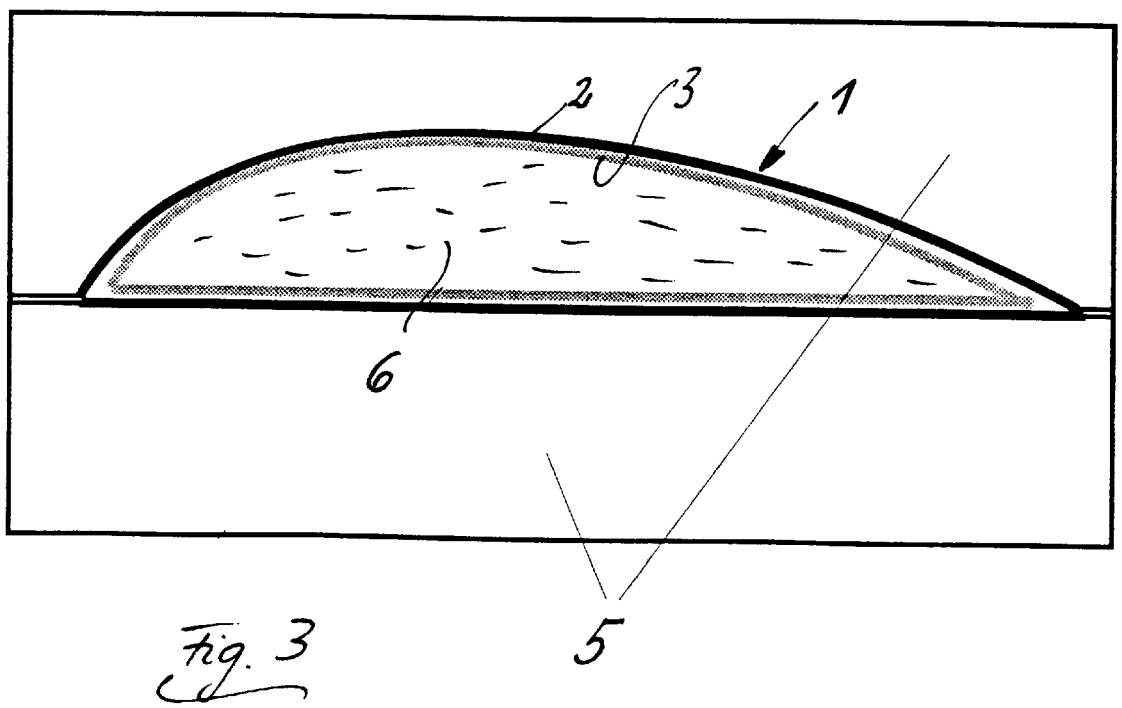

FIG. 3 illustrates, among others, the subsequent forming of this hollow body 1' to the enveloping structure 1 according to the present invention. For this purpose, the hollow body 1' is placed into the cavity of a suitable, split mould 5 and then brought into the desired shape of the enveloping structure 1 by an internal high-pressure forming process. In such an internal high-pressure forming process, which also includes the commonly known hydroforming process, the interior of the hollow body 1' is subjected to high pressure (in particular by filling with a suitable fluid), as a result of which the wall of the hollow body is pressed against the cavity wall of the mould 5 and brought into the desired shape. The application of the known internal high-pressure forming is particularly favorable here because the metal-felt weave 3 applied to the inner side of the sheet 2 in the interior of the hollow body 1' is not prone to damage. In particular, the joint between the sheet 2 and the metal-felt weave 3 produced in the first process step is preserved.

Upon forming of the sheet-weave-assembly 1' into the enveloping structure 1, the composite material which makes up the supporting structure 6 is introduced into the cavity of the enveloping structure 1 according to the present invention. In doing so, this cavity is completely filled with the composite material to ensure that the composite material also reaches the inner side of the sheet 2, thereby penetrating the metal-felt weave 3. Thus, the metal-felt weave 3, which is soldered/brazed or welded to the sheet 2 as already mentioned, is virtually positively molded into the composite material or the supporting structure 6 made therefrom, respectively. Obviously, an intimate bond is thus produced between the supporting structure 6 and the enveloping structure 1 or the sheet 2, respectively. The component made up by the enveloping structure 1 and the supporting structure 6, i.e. the shown blade/vane of a turbomachine, in particular of a gas-turbine engine, is characterized by maximum stability. The joint between the supporting structure 6 and the enveloping structure 1 is intimate and virtually inseparable, with the supporting structure 6 affording this component adequate stiffness and the enveloping structure 1 protecting the composite material of the supporting structure 6 against detrimental external influences.

The process so far described provides for the manufacture of a great variety of blades/vanes or blade/vane shapes. As composites, materials which are not fiber reinforced at all are as suitable as materials with short-fiber reinforcement with a polymeric and/or metallic matrix and materials with long-fiber reinforcement. In any case, however, it is recommended that the process of filling the enveloping structure 1 be performed directly in the mould 5 in which the enveloping structure 1 was previously brought into the desired shape, noting that the thickness of sheet layer may range in the order of 0.1 mm to 2 mm. This precludes any undesired deformation of the enveloping structure 1. For the manufacture of a long-fiber reinforced supporting structure 6, it is proposed that a fiber structure (not shown) is first placed in the cavity of the enveloping structure I after forming and that the composite material is then introduced, preferably by high-pressure infiltration. For the manufacture of non-reinforced or short-fiber reinforced components, the prefabricated enveloping structure can be filled in the mould 5 with short-fiber or particle-reinforced or non-reinforced plastic or metal, for example by the injection-moulding process.

Since the proposed internal high-pressure forming process is very kind to materials, a great variety of materials is available for the manufacture of enveloping structure 1 or, more precisely, the sheet 2 which serves as metallic protective cover for the supporting structure 6, including those materials which are difficult to form. In the light of the typical material requirements, titanium, nickel and copper materials as well as stainless austenitic steels are particularly suitable.

Moreover, a further advantage of the manufacturing process according to the present invention lies in the fact that the process of internal high-pressure forming in a suitable mould 5 enables the outer contour of the components or enveloping structures 1 to be made accurately to the desired shape and that, thereafter, their cavities need only be filled with composite material to form the supporting structure 6, whereupon the finished, accurately shaped component is available. The process according to the present invention, therefore, provides for conformal manufacture of a composite compound with a firmly adherent, metallic surface as mechanical protection and corrosion prevention.

For example, this process is suitable for the manufacture of a MMC fan blade, i.e. a complete compressor wheel with blades made of a metal-matrix composite, but also for PMC fan blades in the case of which a suitable plastic is infiltrated in lieu of magnesium. In all cases, the metal-felt weave 3 provides a high-strength bond between the composite material of the supporting structure 6 and the enveloping structure 1 or the outer sheet-metal skin, respectively. This skin, together with the metal-felt weave 3, can be easily and extremely gently brought into the desired shape by way of an internal high-pressure forming process. Immediately afterwards, the infiltration of the enveloping and the fiber structures can be accomplished in a single operation. This process enables the manufacture of components to be reproduced with extreme accuracy of shape. As compared to current solutions, the process according to the present invention also largely dispenses with manual work and is, therefore, highly automatable.

This process also enables PMC vanes, i.e. guide vanes which consist of a polymeric matrix composite, to be manufactured extremely cost-effectively and with low weight. Accordingly, the outer contour of a vane can, for example, be shaped by hydroforming and the cavity produced filled with thermoplastic short-fiber PMC, or, alternatively, with non-reinforced plastic by way of injection molding, as dictated by the strength requirements. The Fan OGV of a gas-turbine engine can, for example, be made up of an enveloping structure, i.e. a skin sheet 2, of austenitic chromium-nickel steel and a supporting structure 6 of carbon short-fiber reinforced PEEK, and apparently a plurality of modifications other than those described may be made to the embodiments here shown without departing from the inventive concept.

What is claimed is:

1. A process for manufacturing a blade/vane of a turbomachine, the blade/vane comprising a metallic enveloping structure and a composite material supporting structure which is inside of and suitably joined to the enveloping structure, comprising:

joining a metal-felt weave by at least one of welding, soldering and brazing to a sheet of the enveloping structure, and shaping the resulting sheet-weave-assembly by at least one of hydroforming and internal high-pressure forming to provide a desired shape of the enveloping structure, and subsequently introducing the composite material for the supporting structure into a cavity of the enveloping structure.

2. The manufacturing process of claim 1, wherein, when a long-fiber reinforced composite material is used for the supporting structure, first placing a fiber structure into the enveloping structure and subsequently introducing the composite material by infiltration while the enveloping structure is positioned in a mold in which the sheet-weave-assembly shaping takes place.

3. The manufacturing process of claim 1, wherein, when one of a non-fiber reinforced and a short-fiber reinforced composite material is used for the supporting structure, introducing the composite material into the enveloping structure while the enveloping structure is positioned in a mold in which the sheet-weave-assembly shaping takes place.

4. The manufacturing process of claim 1, and further comprising manufacturing the enveloping structure of at least one of titanium sheet, nickel sheet, copper sheet, and austenitic steel sheet.

5. The manufacturing process of claim 2, and further comprising manufacturing the enveloping structure of at least one of titanium sheet, nickel sheet, copper sheet, and austenitic steel sheet.

6. The manufacturing process of claim 3, and further comprising manufacturing the enveloping structure of at least one of titanium sheet, nickel sheet, copper sheet, and austenitic steel sheet.

* * * * *